United States Patent
Weis et al.

(10) Patent No.: US 7,384,592 B2
(45) Date of Patent: Jun. 10, 2008

(54) METHODS FOR MANUFACTURING ULTRAHARD COMPACTS

(75) Inventors: Christopher H. Weis, Riverton, UT (US); Ronald K. Eyre, Orem, UT (US); Stewart N. Middlemiss, Salt Lake City, UT (US); David Iverson, Highland, UT (US)

(73) Assignee: Smith International, Inc, Houston, TX (US)

( * ) Notice: Subject to any disclaimer, the term of this patent is extended or adjusted under 35 U.S.C. 154(b) by 363 days.

(21) Appl. No.: 10/858,662

(22) Filed: Jun. 1, 2004

(65) Prior Publication Data

US 2005/0263944 A1  Dec. 1, 2005

(51) Int. Cl.
*C04B 35/52* (2006.01)
*C04B 35/5831* (2006.01)

(52) U.S. Cl. .................. 264/672; 175/428
(58) Field of Classification Search ........... 264/667, 264/672; 175/428
See application file for complete search history.

(56) References Cited

U.S. PATENT DOCUMENTS

| | | | | |
|---|---|---|---|---|
| 3,913,280 A * | 10/1975 | Hall | .............. | 51/307 |
| 4,109,737 A * | 8/1978 | Bovenkerk | .............. | 175/430 |
| 5,236,674 A | 8/1993 | Frushour | | |
| 5,667,028 A * | 9/1997 | Truax et al. | .............. | 175/428 |
| 5,722,499 A * | 3/1998 | Nguyen et al. | .............. | 175/431 |
| 5,979,579 A * | 11/1999 | Jurewicz | .............. | 175/434 |
| 6,145,607 A * | 11/2000 | Griffin et al. | .............. | 175/426 |
| 6,283,234 B1 * | 9/2001 | Torbet | .............. | 175/432 |
| 6,460,636 B1 * | 10/2002 | Yong et al. | .............. | 175/428 |
| 6,610,095 B1 | 8/2003 | Pope et al. | | |
| 2004/0140132 A1 * | 7/2004 | Middlemiss | .............. | 175/428 |
| 2004/0141865 A1 * | 7/2004 | Keshavan et al. | .............. | 419/5 |
| 2006/0107602 A1 * | 5/2006 | Sigalas et al. | .............. | 51/307 |

FOREIGN PATENT DOCUMENTS

| | | |
|---|---|---|
| GB | 2275690 | 9/1994 |
| GB | 2374618 | 10/2002 |
| GB | 2393187 | 3/2004 |

OTHER PUBLICATIONS

Irish Search Report dated Apr. 25, 2007 for Application No. 2005/0365 (3 pages).

* cited by examiner

*Primary Examiner*—Steven P. Griffin
*Assistant Examiner*—Russell J Kemmerle
(74) *Attorney, Agent, or Firm*—Y. Renee Alsandor (57) ABSTRACT

A method for manufacturing an ultrahard compact includes assembling a mass of ultrahard material with a mass of substrate material such that the mass of ultrahard material extends radially outward a greater extent than the substrate material to compensate for a difference in the radial shrinkage of the ultrahard material compared to the substrate material during a sintering process. The method may further includes subjecting the assembled compact to a high pressure high temperature process that results in the forming of an ultrahard compact including an ultrahard layer integrally bonded with a substrate.

23 Claims, 8 Drawing Sheets

METHODS FOR MANUFACTURING ULTRAHARD COMPACTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

This invention relates to ultrahard compacts, and more specifically to ultrahard compacts including ultrahard material integrally formed with a substrate. The invention also relates to improved methods for forming such ultrahard compacts.

2. Background Art

Ultrahard compacts typically comprise a body of ultrahard material bonded to a substrate. Examples of ultrahard materials include polycrystalline diamond (PCD) and cubic boron nitride (CBN). Substrates of ultrahard compacts typically are formed from a carbide material, such as tungsten carbide cemented with cobalt. Ultrahard compacts are well know for their mechanical properties of high wear resistance making them a popular choice for use as cutting elements in industrial applications, such as in cutting tools for machining and for subterranean mining and drilling tools.

Ultrahard compacts are typically formed by loading a can assembly with ultrahard material particles and substrate material and then subjecting the assembly to a high pressure high temperature (HPHT) pressing process that results in the sintering of the ultrahard material particles and bonding of the ultrahard material to the substrate. Methods for making ultrahard compacts are more fully described in U.S. Pat. Nos. 3,609,818; 3,743,489; 3,745,623; 3,850,591; 4,403,015; 4,954,139; and 6,610,095, the disclosures of which are expressly incorporated herein by reference.

Figure 1:
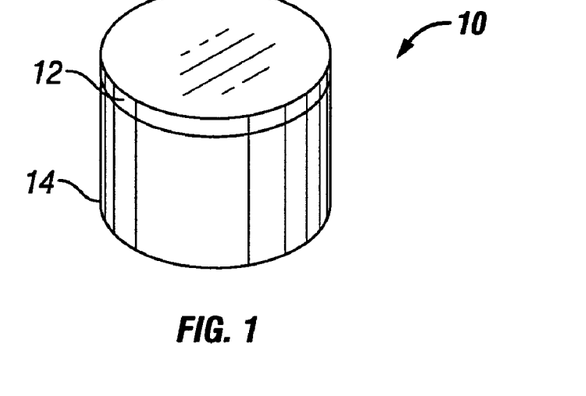
FIG. 1 shows one example of an ultrahard compact that may be formed in accordance with an embodiment of the present invention.

Ultrahard compacts used for cutting tools and drilling tools are most commonly made in the form of a cylindrical member as illustrated in FIG. 1. The refractory metal containers used to form these compacts have cylindrical walls of uniform internal diameter along the length of the can. Ultrahard compacts produced in these types of cans have been found to have as much as a 20% to 30% difference in radial shrinkage between ultrahard material and substrate material when the compact is retrieved from the can after a pressing process. This has been found to be especially true for compacts formed with thicker ultrahard material layers, such as layers 1.0 millimeters (mm) or more in thickness. This is also particularly true for ultrahard compacts that are sintered in a high pressure high temperature apparatus known as a cubic press, although similar issues exist when compacts are formed using other types of presses, such as a belt press. The difference in radial shrinkage is believed to be due to differences in the shrinkage and consolidation of the different materials.

Figure 4:
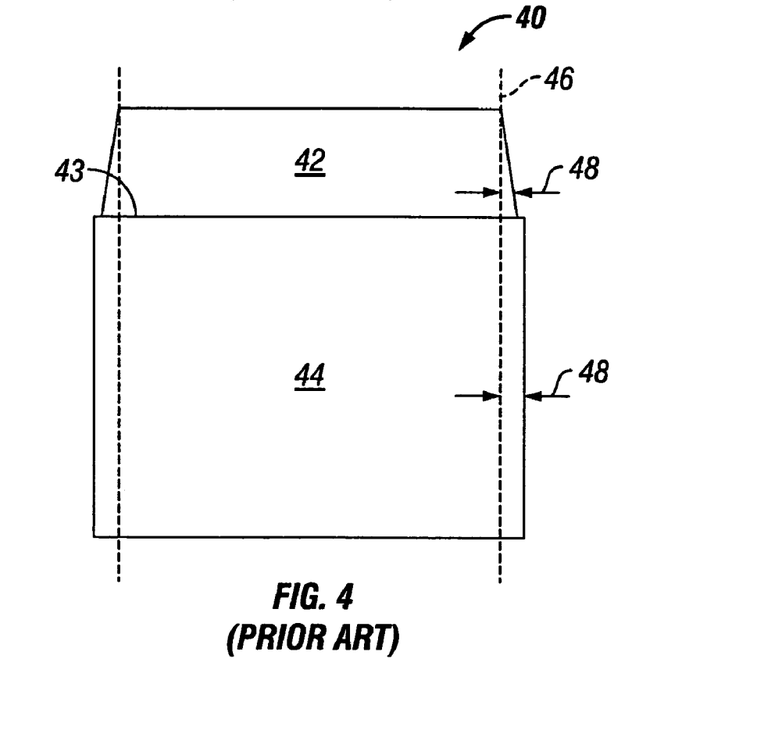
FIG. 4 shows a cross-section view of an ultrahard compact retrieved after a pressing process that has been formed in accordance with conventional methods for forming a compact.

Ultrahard compacts, especially those with thick ultrahard layers, are typically tapered in form when recovered from the press, as illustrated for example in FIG. 4. The layer of ultrahard material 42 in these compacts 40 is tapered such that the ultrahard material nearest the substrate 44 (proximal interface 43) has the largest diameter and the ultrahard material furthest away from the substrate 44 has the smallest diameter. To obtain an ultrahard compact having a final desired uniform shape, these compacts 40 must be ground after the HPHT pressing process to bring the ultrahard material 42 and the substrate 44 to the same desired diameter 46 along the entire length of the compact 40. The thicker the body of ultrahard material 42 is on the substrate 44, the more pronounced the taper will be after the pressing operation, and the more grinding required to obtain a final uniform product.

Following conventional methods of manufacturing compacts as described above, the cost associated with centerless grinding of a compact with a diamond wheel to produce a final uniform product can be as much as 20% to 40% or more of the overall cost of the product, depending on the thickness of the ultrahard material body and the type and composition of the ultrahard material used to form a compact. Reducing the amount of centerless grinding required to manufacture an ultrahard compact of desired shape can result in a substantial cost saving due to a reduction in the number of grinding wheels required to finish products and in the time spent grinding and finishing products. Therefore, a method for manufacturing ultrahard compacts that reduces the amount of grinding and finishing required to obtain a final product is desired.

SUMMARY OF INVENTION

In one aspect, the invention provides a method for manufacturing an ultrahard compact. In one or more embodiments, the method includes assembling a mass of ultrahard material assembled with a mass of substrate material to form a pre-sintered compact. The mass of ultrahard material is formed to extend further from a central axis that the mass of substrate material. The mass of substrate material is formed to extend to form at least a part of the side surface of the pre-sintered compact. The method may further include subjecting the pre-sintered compact to a high pressure, high temperature pressing process that forms the ultrahard compact including a layer of ultrahard material integrally formed with a substrate.

In another aspect, the invention provides a container assembly for forming a compact. The container assembly includes a generally cylindrical container having an internal diameter that varies along its length, generally defining a first section and a second section in the container. At least one end of the container is opened to allow placement of material therein. A diameter of the container in the first section is between about 2% and 20% larger than a diameter of the container in the second section. The second section is between 8 mm and 80 mm in diameter. The height (or length) of the first section is at least about 1.0 mm.

In another aspect, the method provides a pre-sintered compact. In one embodiment, the compact includes a mass of ultrahard material and a mass of substrate material. The mass of ultrahard material is assembled with the mass of substrate material such that the mass of ultrahard material extends an additional amount further from a central axis than the mass of substrate material. The mass of substrate material extends to form at least part of the side surface of the compact.

In another aspect, the invention provides a method for a container. In one embodiment, the method includes placing a mass of ultrahard material in a first section of a container and placing the first section of the container in a forming die. The method further includes extending a force on the mass of ultrahard material to force a side wall of the container to expand outward such that the side wall extends further in the first section than in the second section.

Other aspects and advantages of the invention will be apparent from the following description and the appended claims.

DETAILED DESCRIPTION

The present invention relates to an improved container assembly for forming ultrahard compacts, as well as methods for forming ultrahard compacts and ultrahard compacts formed by such methods. The invention also relates to cutting tools and drilling tools having one or more ultrahard compacts formed in accordance with embodiments of the present invention.

One example of an ultrahard compact that may be formed in accordance with an embodiment of the invention is shown in FIG. 1. In this example, the compact 10 is generally cylindrical in shape and includes an ultrahard layer 12 bonded onto a substrate 14. The ultrahard layer 12 may be formed of any ultrahard material known in the art, such as polycrystalline diamond (PCD), cubic boron nitride (CBN). The substrate 14 may be formed of any metal carbide known in the art, such as tungsten carbide with cobalt binder. This type of compact 10 may be used as a cutting element for an earth boring bit or other cutting tool.

An ultrahard compact as shown in FIG. 1 is typically formed by placing a mass of ultrahard material and a mass of substrate material in a container assembly for pre-forming a compact and then subjecting the loaded container assembly to a high pressure, high temperature (HPHT) pressing process that causes crystalline bonds to form between ultrahard particles and ultrahard material to bond to the substrate. The ultrahard material loaded into the container assembly before the pressing process may be a mass of ultrahard material particles or a previously sintered granulated mass of ultrahard material. Similarly, the substrate material may be in the form of metal particles infiltrated with binder or a previously formed solid metal carbide body. Numerous other variations are also well known in the art for forming ultrahard compacts. The above description is provided for illustrative purposes and is not intended to limit the invention.

Figure 2:
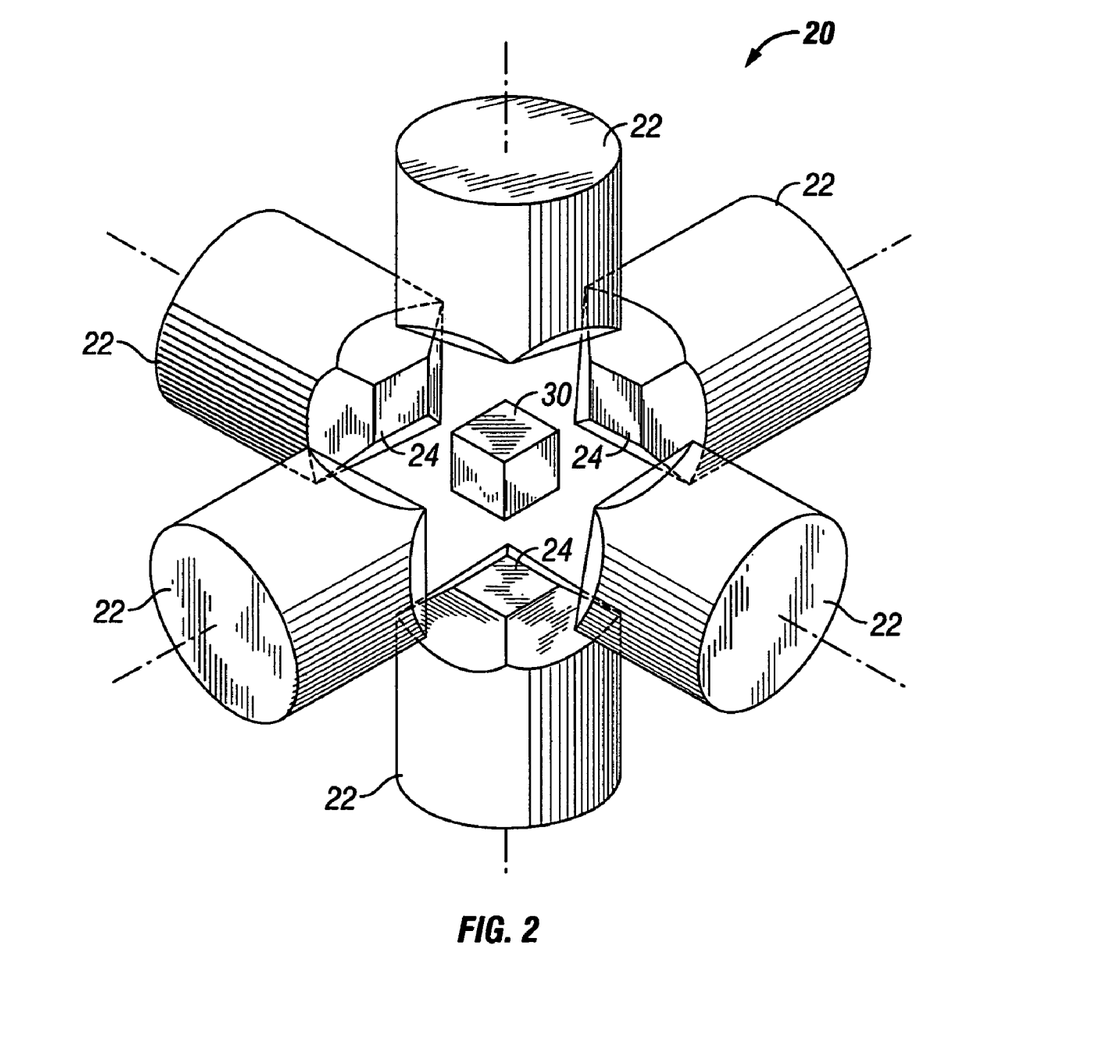
FIG. 2 shows a schematic view of a cubic press used for sintering ultrahard compacts.

FIG. 2 shows one example of a press that can be used to carry out HPHT processes for forming ultrahard compacts. This type of press is known as a cubic press 20. The press is used to subject a loaded container assembly to high pressure and high temperature conditions for a time sufficient to produce the desired bonding of the compact material to form an integral ultrahard compact. Operational techniques for simultaneously applying high pressures and high temperatures in this and similar types of presses, such as a belt press, are well known in the art and not repeated here.

As shown in FIG. 2, the cubic press 20 includes six anvils 22 which are arranged in opposing pairs for rectilinear movement along three mutually perpendicular coordinate axes. The anvils 22 include sloping shoulders that terminate in equal area square faces 24. Each of the anvils 22 is attached to and powered by support apparatus (not shown) which includes a double acting hydraulic ram affixed to a base. The motion of the anvils 22 is synchronized by an anvil guide mechanism (not shown), such that the thrust of the six rams simultaneously moves the anvils 22 toward a symmetry center of the press 20 to engage a reaction cell 30 containing one or more container assemblies filled with compact material. The reaction cell 30 in the press 20 has square faces that are set parallel to and are greater in area than the corresponding anvil faces 24. The outer body of the reaction cell 30 is formed of a pressure transfer medium, such as pyrophyllite or another appropriate pressure transfer material able to undergo the pressures applied by the cubic press 20.

During a pressing process, the anvils 22 advance and engage with the reaction cell 30 to extrude and compress the reaction cell 30 between the sloping shoulders of the anvils 22. The forced engagement of the anvil faces 24 with the reaction cell 30 generates pressure on the reaction cell 30 which is transferred to the one or more compact assemblies contained in the reaction cell 30. As the reaction cell 30 is being pressed, heat is generated in the reaction cell 30 by passing electric current through the anvils 22 to a heating unit in the reaction cell 30.

Figure 3:
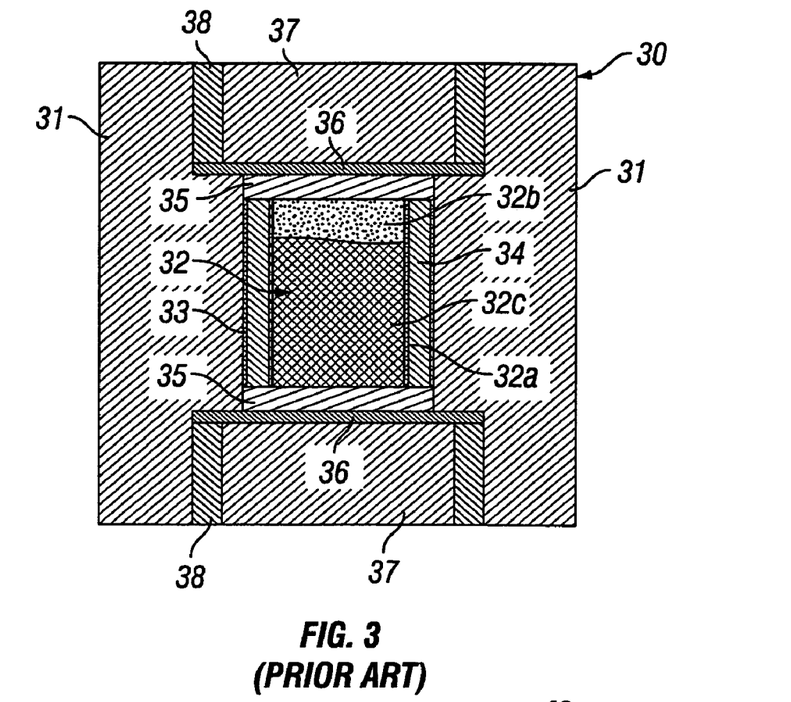
FIG. 3 shows a cross-section view of the cubic cell shown in FIG. 2.

A cross-section view of one example of a reaction cell 30 is shown in FIG. 3. The outer body 31 of the reaction cell 30 is formed of a pressure transfer medium, such as pyrophyllite. The body 31 has a central cavity formed therein to permit placement of a loaded container assembly 32 in the body 31 of the reaction cell 30. An electrical resistance heating tube 33 is disposed in the central cavity of the reaction cell 30. The heating tube 33 may be formed of any suitable high electrical resistant material, such as solid or foil graphite, amorphous carbon, pyrolytic carbon, refractory metals or high electrical resistant metals. A non-electrically conductive liner 34 is disposed in the heating tube 33. The loaded container assembly 32 is disposed in the heating tube 33, surrounded by the liner 34. Non-electrically conductive discs 35 are disposed at each end of the liner 34 enclosing the loaded container assembly 32 in non-electrically conductive material, such as white salt (NaCl) compressed to 90% or more of its theoretical density to preserve high pressures of the sintering system and to maintain good geometrical stability of the manufactured part. Electrically conductive disks 36 are disposed on the exterior sides of the non-conductive disc 35 in electrical communication with the heating tube 33 to provide an electrical connection to the heating tube 33. An end cap assembly including an nonconductive end plug 37 formed of a pressure transferring medium surrounded by an electrical conducting ring 38 is disposed adjacent each conductive disk 36 to enclose the loaded container assembly 32 in the central cavity of the reaction cell 30 while providing an electrical connection to the heating tube 33. The conductive discs 36 and the conductive rings 38 may be formed of any suitable electrically conductive material, such as metal. The non-conductive liner 34, non-conductive discs 35, and non-conductive end plugs 37 may be formed of any suitable pressure transferring and electrically insulating medium, such as sodium chloride, pyrophyllite, a suitable synthetic substitute for pyrophyllite, talc, or hexagonal boron nitride.

The loaded container assembly 32 disposed in the reaction cell 30 includes a conventional cylindrical container assembly 32a which has a constant radius along its length. The container assembly 32a is formed of a refractory metal material, such as molybdenum, zirconium, tantalum, hafnium, tungsten, or niobium. The container assembly 32a is loaded with a mass of ultrahard material particles 32b and substrate material 32c. Binder material may be premixed with the ultrahard material particles 32b. Other materials (not shown) may also be included in the loaded container assembly 32, such as one or more layers of transition material disposed between the ultrahard material particles 32b and the substrate material 32c.

During a pressing process, the reaction cell 30 undergoes pressure exerted by the anvils (22 in FIG. 2) of the press (20 in FIG. 2). During the pressing process, heat is generated in the reaction cell 30 by passing an electric current through the anvils (22 in FIG. 2) to the metal rings 38, metal discs 36, and the heating tube 33 which is formed of a highly electrically resistive material, such as graphite. This passing of electrical current to the heating tube 33 results in the generation of heat in the cavity of the reaction cell 30. The liner 34 disposed between in heating tube 33 around the loaded container assembly 32 allows heat and pressure to be transferred to the loaded container assembly 32 while electrically insulating the container 32a of the assembly from the heating tube 33. After a time sufficient for forming desired bonds between compact materials, the electrical current is ceased, the temperature in the reaction cell 30 is reduced, and the pressure on the reaction cell 30 is removed. The reaction cell 30 is then removed from the press (20 in FIG. 2), cracked open, and the loaded container assembly 32 is removed.

FIG. 4 shows one example of a compact 40 formed using a conventional cylindrical container assembly with a constant radius along its length (as shown at 32a in FIG. 2). This compact was formed with a thick ultrahard layer 42 bonded to a substrate 44. The shape of the compact 40 out of the press is tapered in form as discussed in the Background section herein. The material to be removed 48 from the compact to obtain a desired geometry 46 is significant, and will require a significant amount of grinding with diamond wheels to achieve the desired form.

Pre-Formed Compact

In one aspect, the present invention provides a method for forming an ultrahard compact which includes forming a mass of ultrahard material placed with substrate material such that the mass of ultrahard material is radially oversized with respect to the substrate material prior to a pressing process so sufficient ultrahard material is provided to compensate for a greater radial shrinkage that occurs in ultrahard material versus substrate material during the pressing process. Pre-forming an ultrahard compact in this way, advantageously, can result in the production of an ultrahard compact from the press having a thick ultrahard layer that is close to a desired uniform geometry with the substrate such that the amount of grinding required to produce a final product is reduced.

Container Assembly

Figure 5:
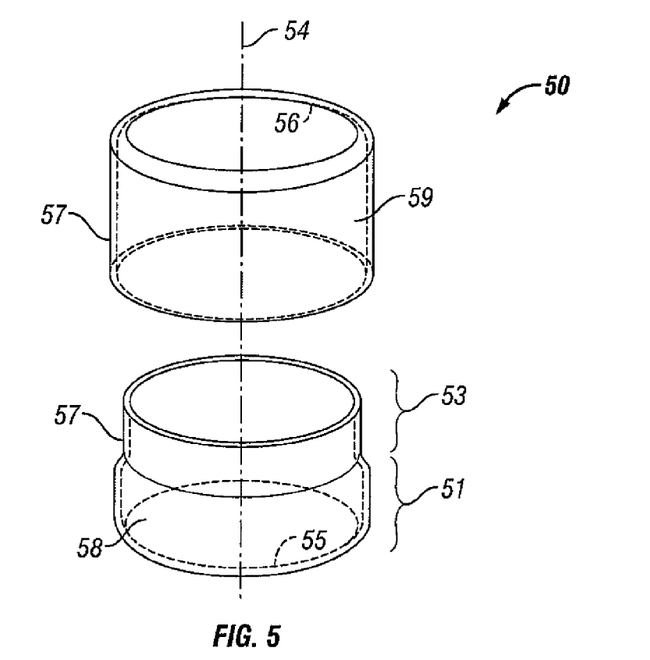
FIG. 5 shows one example of a container assembly in accordance with an embodiment of the present invention.

In another aspect, the present invention provides a container assembly for performing a compact. Referring to FIG. 5, in one embodiment the container assembly 50 includes a container 58 having side walls 57 adapted to define at least one first section 51 and at least one second section 53, wherein the first section 51 is configured to have an internal profile that extends further radially outward (in a plane generally perpendicular to a longitudinal axis 54) than the internal profile of the second section 53. The first section 51 is adapted to form ultrahard material for a compact. The second section 53 is adapted to form substrate material for the compact. The first section 51 is expanded radially outward a greater extent than the second section 53 to permit placement of additional ultrahard material with the substrate material to compensate for differences in radial shrinkage, including consolidation, that occur in ultrahard material versus substrate material when the compact materials are subjected to a pressing process.

Referring to FIG. 5, in one or more embodiments, the container assembly 50 may include a container 58 with at least one end cap 59 adapted to couple with an open end of the container 58 to form an enclosed vessel. The container assembly 50 generally includes a first end 55, a second end 56 and side walls 57. The side walls 57 are contoured to define an internal profile of the container assembly 50 that changes in radial extent along the length of the container assembly 50 to form at least one first section 51 that bulges outward a further distance from a longitudinal axis 54 than at least one second section 53 to permit placement of an oversized mass of ultrahard material with the substrate material in the container assembly 50 to compensate for differences in shrinkage of the materials during sintering. A container assembly in accordance with an embodiment of the invention may be formed of any suitable refractory metal, including niobium, tantalum, tungsten, molybdenum, zirconium, hafnium, and titanium.

A container assembly as described above may be used to form compact. The compact may be formed by first placing a mass of ultrahard material in the first section 51 of the container assembly 50; the container 58 of the container assembly 50 being positioned as shown so that material can be loaded therein. The ultrahard material may be in the form of an ultrahard material particles or a previously sintered granulated mass. The ultrahard material may be packed or pre-pressed into the first section 51 to eliminate voids in the first section 51. Substrate material is then placed on top of the ultrahard material. The compact materials are then enclosed in the container assembly 50 by placing the end cap 59 over the exposed end of the substrate and in engagement with the open end of the container 58. The container assembly may then be pressed together to further compact the materials therein, eliminating voids, and create sealing engagement between the container 58 and then end cap 59 of the container assembly 50.

A container assembly contoured in accordance with one or more embodiments of the invention may be particularly desired for the manufacture of compacts having thicker ultrahard layers, such as layers at least 1.0 millimeters (mm) thick or more, to allow for the production of ultrahard compacts from the pressing process having closer to desired uniform geometries. Forming a compact in accordance with one or more embodiments of the invention as described above, advantageously, can reduce the amount of grinding required to obtain a final product. The amount of grinding required may be reduced by 15%, and in some cases by as much as 30%. In the production of compacts with thicker diamond tables, the reduction in the material to be removed may be as much as 50% or more. Reducing the amount of grinding required can significant reduce manufacturing costs for ultrahard compacts because diamond grinding wheels required for grinding compacts to desired geometries are very expensive. Additionally, because the ultrahard material being ground is very hard, grinding to a final desired geometry can be very time consuming. This is especially true for compacts having thicker ultrahard layers. Therefore, providing a method and apparatus that can be used to reduce the amount of grinding required to produce final products can result in a significant cost savings and time savings in manufacturing ultrahard compacts. In particular, the number of diamond wheels required to produce such compacts can be significantly reduced.

Forming a Container Assembly

In anther embodiment, the invention also provides a method for forming a container assembly. In one embodiment, the method includes forming a container assembly such that the walls inside the container assembly are bulged out in a first section a greater distance from a longitudinal axis than the walls in a second section of the container assembly to permit the placement of a radially larger mass of ultrahard material in the container assembly than the substrate material. The ultrahard material can then be loaded in the first section, and substrate material loaded in the second section of the container. The ultrahard material and substrate material can then be enclosed in the container assembly. The loaded container assembly can then be subjected to a high pressure high temperature sintering process sufficient to integrally form an ultrahard compact including an ultrahard layer of material integrally formed with a substrate.

Figure 6:
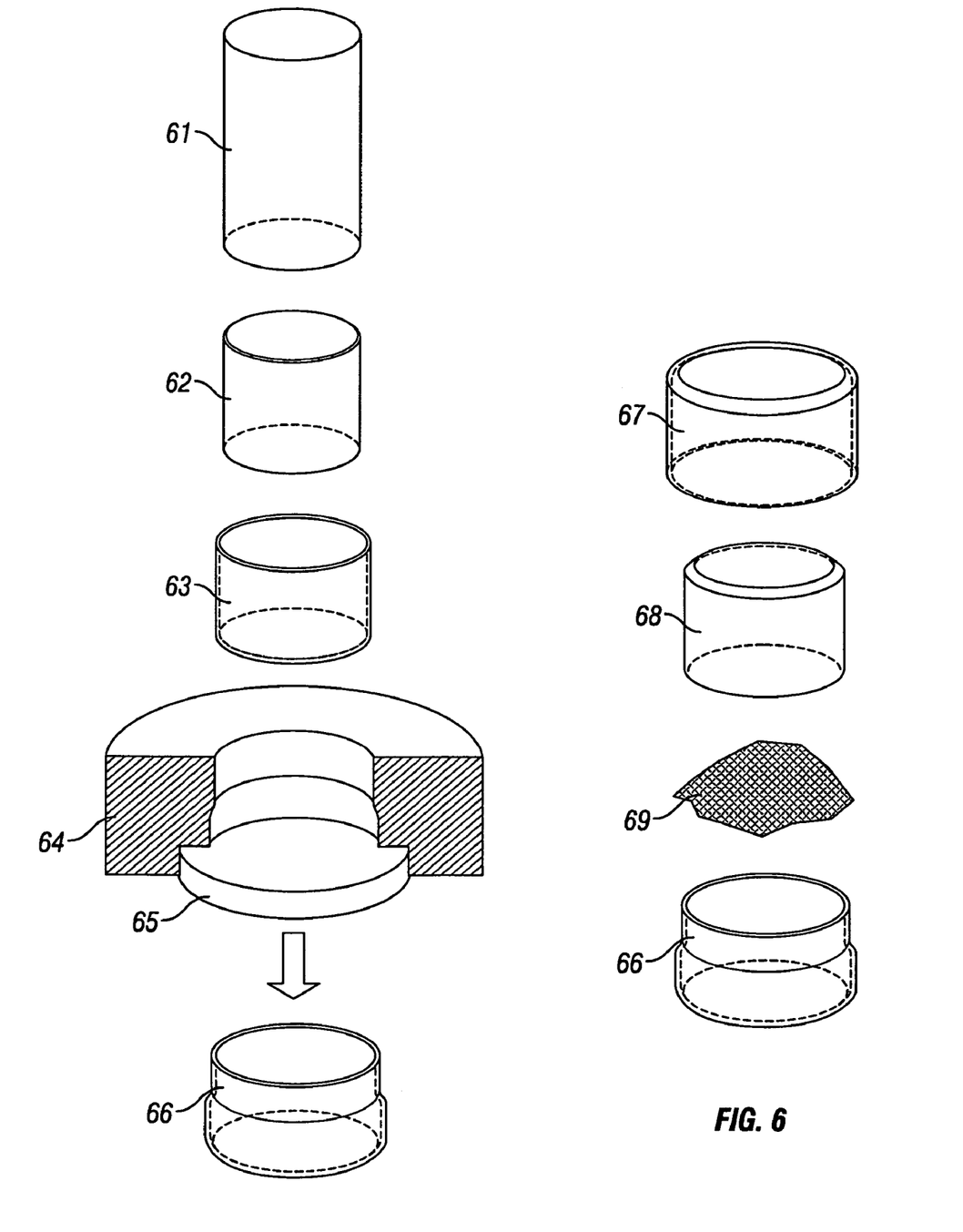
FIG. 6 shows one example of a method for forming the container assembly shown in FIG. 5 and pre-forming an ultrahard compact in accordance with an embodiment of the present invention.

One example of a method that may be used to form a container assembly in accordance with an embodiment of the present invention is shown in FIG. 6. In this example a section of a conventional refractory metal container 63 is expanded radially outward in a forming die 64 to produce a formed container 66 in accordance with an embodiment of the invention. The forming die 64 is formed of a hard material, such as hardened steel or sintered carbide, and adapted with an internal geometry corresponding to the desired geometry of the formed container. A forming button 65, also formed of a hard material, such as a hardened steel or sintered carbide, is positioned at one end of the forming die 64 adjacent the desired bulged section of the forming die 64. The container 63 is placed on the forming button 65 in the forming die 64 with the section of the container 63 to be expanded radially outward disposed in the radially larger section of the forming die 64. An elastomer material 62 is placed in the container 63 and a punch 61, made of a hard material such as a hardened steel or sintered carbide, is used to provide loading on the elastomer material 62 placed in the container 63 which forces the container 63 to expand radially outward to form the desired shape defined by the forming die 64. After the container 63 is formed, the forming button 65 is removed from the larger end of the forming die 64 and the formed refractory metal container 66 is retrieved.

After the formed container 66 is retrieved from the die 64, the formed container 66 can be loaded with ultrahard material 69 in the radially expanded section of the container 66. A carbide substrate 68 is then placed on top of the ultrahard material 69 and the end cap 67 placed over the end of the substrate 68 in overlapping engagement with the opened end of the formed container 66 to enclose the ultrahard material 69 and substrate material 68 in the container assembly. Once the loaded container assembly is formed, the loaded container assembly may be pre-pressed to remove voids or trapped air and, then, loaded into a press and subjected to a HPHT pressing process that results in sintering of the ultrahard material and bonding of the ultrahard material to the substrate.

Figure 7:
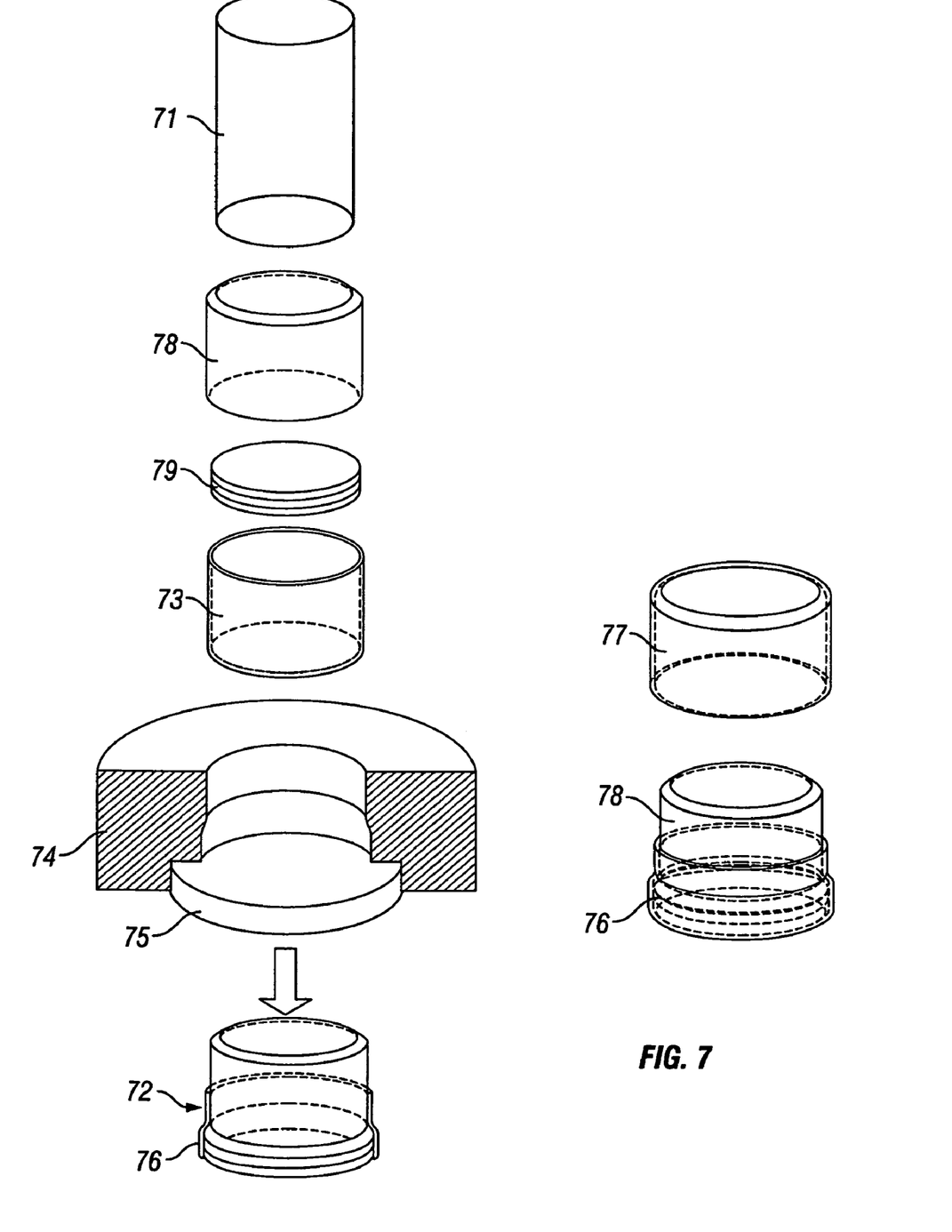
FIG. 7 shows another example of a method for forming a container assembly as shown in FIG. 5 and pre-forming an ultrahard compact in accordance with an embodiment of the present invention.

Another example of a method that may be used to form a container assembly in accordance with an embodiment of the present invention is shown in FIG. 7. In this example, a conventional refractory metal container 73 is loaded with a mass of ultrahard material 79 in the form of particles or granules pre mixed with binder. A carbide substrate 78 is then placed on the mass of ultrahard material 79. The loaded container 73 is placed in the forming die 74 against a forming button 75 that supports the container 73. A punch 71 is then used to punch the container 73 into the shape defined by the forming die 74 by impacting the material in the container 73 with a load that forces the ultrahard material to displace, where possible, radially outward, which causing the container to expand outward in the section of the container containing the ultrahard material 79. Once formed, loaded container 72 is retrieved from the die 74 by removing the forming button 75 from the larger end of the die 74. The end cap 77 for the container 76 is then placed on the loaded container 72 in overlapping engagement with the open end of the formed container 76 to enclose the compact material in the container assembly. Once the loaded container assembly is assembled, it may be pre-pressed to remove voids and trapped air and then loaded into a press and subjected to a HPHT process that results in the formation of an integrally formed ultrahard compact of substantially uniform shape.

Forming a Compact

In anther aspect, the invention provides a method for forming a compact in a pre-sintered state to produce an ultrahard compact in a HPHT process having an "out-of-press" geometry (i.e., geometry produced from the press)

that is closer to a desired net shape than if the compact were produced using a conventional container assembly. Such methods may be particularly useful for forming ultrahard compacts having thicker diamond tables, such as diamond tables 1.0 mm or more, and more preferably 1.5 mm or more in thickness.

Figure 8:
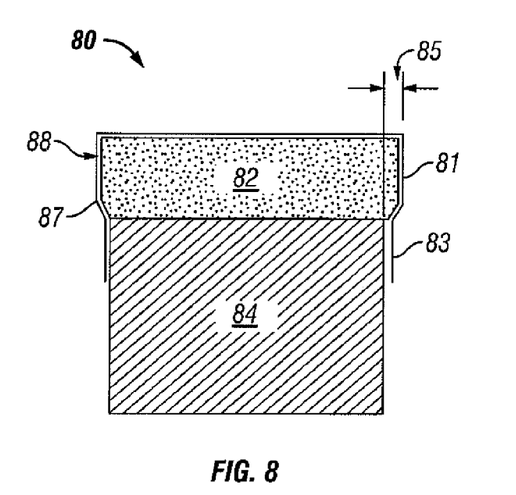
FIG. 8 shows a cross-section view of a pre-formed compact in accordance with one embodiment of the present invention.

A cross sectional view of a pre-sintered compact formed in accordance with one embodiment of the invention is shown in FIG. 8. The pre-sintered compact 80 includes a container 88 used to form ultrahard material 82 and substrate material 84. The pre-sintered compact 80 also includes a mass of ultrahard material 82 and a mass of substrate material 84 which are loaded in the container 88. The container 88 has an internal geometry defined by side walls 87 which are adapted to permit the placement of a radially larger mass of ultrahard material 82 in the container 88 with the substrate material 84 so that additional ultrahard material is provided in a bulged portion 85 of the container 88 to compensate for the greater radial shrinkage of ultrahard material 82 with respect to substrate material 84 when the pre-sintered compact 80 is subjected to a HPHT pressing process to sinter the compact 88. The side walls 87 are shaped to form at least one first section 81 and at least one second section 83 in the container 88. The first section 81 has an internal volume that is expanded radially outward with respect to the internal volume of the second section 83. The first section 81 may be generally described as a section of the container having an internal cross section (in a plane perpendicular to the view shown) at a point along the longitudinal axis that is generally similar in form, but larger in size than the internal cross section of the second section 83.

The ultrahard material 82 placed in the first section 81 of the container 88 may be in the form of ultrahard material particles. For example, the ultrahard material 82 may comprise diamond powder. The substrate material 84 loaded in the second section 83 of the container 88 may comprise, for example, an integral tungsten carbide substrate infiltrated with binder, such as cobalt, nickel or iron. In other embodiments, the compact material may be any material known in the art for forming an ultrahard compact. The pre-sintered material can be enclosed in the container 88 by placing an end cap (such as 77 in FIG. 7) over the exposed end of the substrate 84 in overlapping engagement with the container 88.

A pre-sintered compact as described above may be loaded into a pressing assembly (such as reaction cell 30 in FIG. 3), placed in a press (such as cubic press 20 in FIG. 2), and then subjected to a HPHT process for times sufficient to produce polycrystalline bonds between ultrahard material particles and bond the ultrahard material 82 to the substrate material 84. For example, during the pressing process, the loaded container assembly may be subjected to pressures as high as 5-7 GPa and temperatures as high as 1350-1600° C. The loaded container assembly may be subjected to a predetermined pressure, then the temperature increased, and then the pressure further increased to a desired pressure and maintained there for a time sufficient for the ultrahard material particles to form polycrystalline bonds. The temperature is then reduced, the pressure slowly released, and the resulting compact removed from the press. Operating conditions for several different pressing operations are well known in the art and those skilled in the art will appreciate that the above description is only one example, and not a limitation on the invention.

Oversizing the ultrahard material relative to substrate material for a compact in the pre-sintered state, advantageously, can result in the production of an ultrahard compact having near-net shape geometry directly from the press that requires less material removal to obtain a finished product of desired form.

Figure 9:
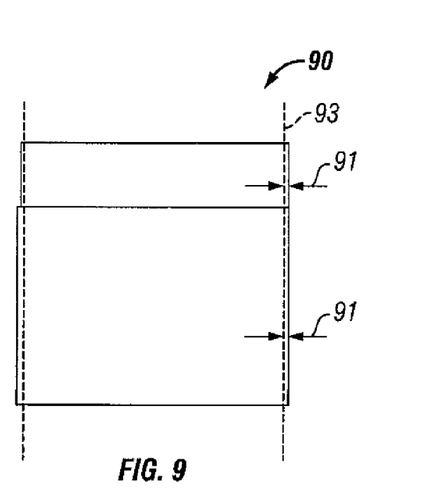
FIG. 9 shows a cross-section view of an ultrahard compact retrieved after a pressing process that has been pre-formed in accordance with an embodiment of the present invention.

FIG. 9 shows one example of an ultrahard compact formed in a cubic press using a container assembly similar to the one shown in FIG. 8. After the pressing process, the reaction cell (similar to 30 in FIG. 1) surrounding the assembly is cracked opened and the loaded container assembly (similar to 50 in FIG. 5) containing the sintered compact is removed. The container assembly (50 in FIG. 5) is then removed from the compact, by grinding. The container material can be easily and quickly removed from the surface of the compact due to its relatively soft structure compared to the ultrahard material used for the grinding operation. After the container assembly is removed, an ultrahard compact 90 as shown in FIG. 9 is obtained. The resulting compact has an out-of-press geometry very close to the near net shape desired for the final product.

An ultrahard compact 90 as shown in. FIG. 9 was formed in a pressing process similar to a pressing process used to produce the compact 40 illustrated in FIG. 4. However, the compact 40 in FIG. 4 was formed using a conventional metal container having cylindrical side walls of uniform diameter along the length. A container assembly similar to the one shown in FIG. 5 was used to form the compact 90 shown in FIG. 9. Comparing the out-of-press geometries of compact 90 with compact 40 in FIG. 4, it was found that forming a compact in accordance with an embodiment of the present invention can, advantageously, result in an out-of-the-press geometry that is closer to a desired net geometry (indicated by lines 93 in FIG. 9) than that of a compact formed using a conventional container (desired geometry indicated by and lines 46 in FIG. 4). Forming ultrahard compacts in accordance with one or more embodiment of the present invention, advantageously, can reduce the amount of material required to be removed (91 in FIG. 9 versus 48 in FIG. 4) to produce a desired final geometry. The material to be removed (91 in FIG. 9) can be centerless ground to obtain a desired geometry (93 in FIG. 9) at a substantially cost savings compared to material to be removed (48 in FIG. 4) for conventionally formed compacts.

In accordance with one or more embodiments of the present invention, the material to be removed from a cutter formed using a conventional refractory metal container can be significantly reduced by reconfiguring the container to form the compact material prior to sintering in accordance with an embodiment of the present invention. One or more embodiments of the present invention allow for the radial placement of additional ultrahard material in the ultrahard material region of a container to compensate for shrinkage that occurs in the ultrahard material layer during sintering. As a result, an ultrahard compact of near net shape can be produced from the press and the amount of material to be removed can be significantly reduced, resulting in a saving in manufacturing output time and grinding wheel cost. By producing ultrahard compacts in accordance with an embodiment of the invention, the amount of materials used to form compacts, the number of diamond wheels required to produce compacts, and the time for producing compacts can all be significantly reduced. Also, in one or more embodiments, by bulging the refractory metal container for forming an ultrahard compact with a thick ultrahard layer in the region of the container that defines the pre-sintered shape of the ultrahard material, the need for significant amounts of grinding due to the radial shrinkage of the material during sintering can be significantly reduced.

ADDITIONAL EXAMPLES

Forming an ultrahard compact in accordance with one or more embodiments described above may be especially useful in the manufacture of compacts having thicker ultrahard layers, such as ultrahard layers having thicknesses of around 1.0 mm or more. In some cases, methods in accordance with embodiment of the invention may be particularly desired for compacts having ultrahard layers that are around 1.5 mm or more in thickness.

In one or more embodiments, a container assembly may be configured to form a compact wherein the wall of the container in the first section extends outward further from a central axis than the wall in a second section by at least about 2% or more of the radial extent of the wall in the second section. In one or more embodiments, the radial extent will be less than or equal to 20% of the extent of the wall in the second section. Also, in one or more embodiments, the height of side wall forming the first section may be greater than 1.0 mm; although, the height may vary around the container.

For example, container assemblies may be configured to form cylindrical compacts within a product diameter range of 8 mm to 75 mm, and more typically between 8 mm and 25 mm. The expansion diameters used to expand the container assemblies in the ultrahard material forming region may range from about 2% to about 20% of the original diameter of the container, which prior to sintering may be between 8 mm and 80 mm, and more typically between 8 mm and 30 mm. In one or more embodiments, the radial expansion of a container in the ultrahard forming region of the container is 2% to 12% the original diameter of the container (or of the diameter of the substrate to be placed in the container). That is, a first section of the container assembly may be expanded or configured to have a diameter (or radial extent) that is 102% to 112% of the diameter (or radial extent) of the second section. Typically, the larger the diameter, the greater the expansion desired. Similarly, the greater the thickness of the ultrahard material, the greater the expansion desired. However, this may not be true in every case. In one or more embodiments, the first section may have an expanded section larger than 20% or more of the radial extent of the second section, depending on the thickness of the materials and material compositions.

In one or more embodiments, the magnitude of the radial expansion of the ultrahard material section versus the substrate material section of a container will depend on the composition of the materials used to form the compact as well as the press operating conditions. In general, the amount of the radial extent of the ultrahard material section compared to the substrate section can be determined for manufacture of a particular type of cutters by manufacturing a series of cutters using different container assemblies with ultrahard material sections of differing radial extensions. For example, given a set of specifications for forming a series of compacts (e.g., product size, material composition, ultrahard layer thickness, press type, etc.), a number of containers having bulged sections of different radial expansion may be used, such as between 2 and 12% of the substrate diameter, increments of 2%, and the resulting out-of-press geometries examined and compared to determine a best container configuration to produce a desired compact near net geometry after the pressing process.

Variables that may affect the expansion percentage desired in a container assembly include the product diameter, the ultrahard material thickness, the press type, the pressing cell configuration (e.g., axial and radial proportions), and the ultrahard material composition (e.g., such as average grain size, composition, metal content, etc.). Regarding the press type, it has been found that higher axial loaded press configurations typically require less expansion of the container because differences between the radial shrinkage of ultrahard material and substrate material are typically smaller in these presses than in those not having as high of axial loads, such as cubic presses.

Figure 10:
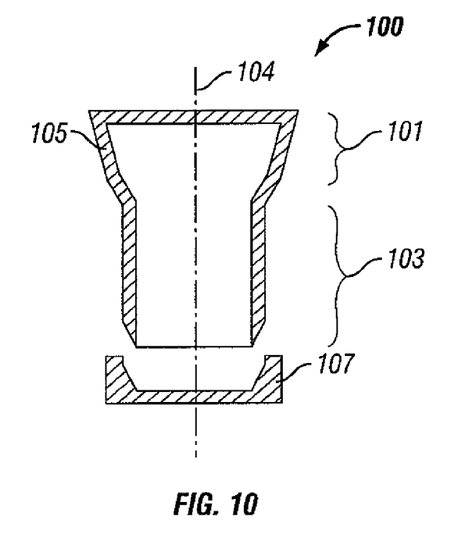
FIG. 10 shows another example of a container assembly in accordance with an embodiment of the present invention, wherein the first section of the container assembly expands radially outward in a direction away from a first section.

Referring to FIG. 10, in one or more embodiments a container assembly 100 may include a container 105 with an end cap 107, wherein the container is configured to include a first section 101 that tapers radially outward from a longitudinal axis 104 in a direction away from a substrate forming section 103 to allow for a placement of ultrahard material in the container 100 to compensate for an increased radial shrinkage that occurs in ultrahard material with distance away from substrate material.

Figure 11:
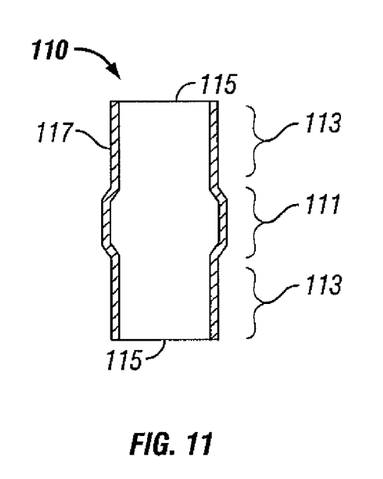
FIG. 11 shows another example of a container assembly in accordance with an embodiment of the present invention, wherein a first section is disposed between second sections.

Although example container assemblies shown in figures are illustrated as two-part vessel comprising a container and an end cap, those skilled in the art will appreciate that embodiments of the invention are not limited to any particular configuration. For example, in other embodiments, a container assembly may include a vessel having at least one opened end to allow for loading of compact materials in the vessel and a corresponding end cap adapted to mate with the at least one opened end to enclose materials in the vessel, wherein the vessel has side walls configured to define at least one first section and at least one second section in accordance with one or more embodiments described above. Referring to FIG. 11, in one or more embodiments a container assembly may include a container 110 having openings at both ends 115 and end caps (not shown) adapted to mate with each end of the container 110 to enclose compact material loaded therein. The container 110 includes side walls 117 adapted to form a contoured internal profile along the inside length of the container 110 which generally outlines an ultrahard material forming section 111 disposed between two substrate forming sections 113. The walls in the ultrahard forming section 111 are bulged outward with respect to the walls in the substrate forming section 113 to permit placement of a radially larger mass of ultrahard material between substrate materials to compensate for differences in radial shrinkage during sintering.

Figure 12:
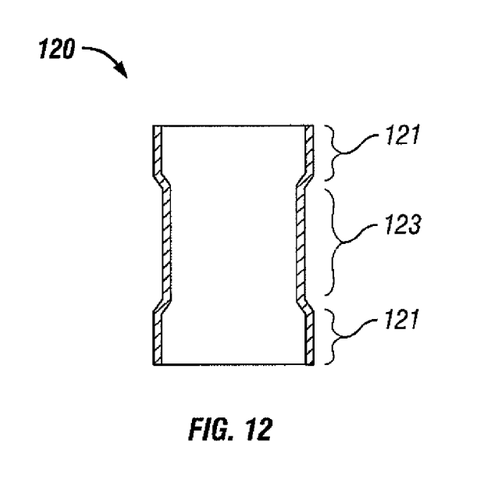
FIG. 12 shows another example of a container assembly in accordance with an embodiment of the present invention, where a second section is disposed between first sections.

FIG. 12 shows another example in accordance with an embodiment of the invention, wherein a container 120 includes a substrate forming section 123 disposed between two ultrahard forming sections 121, which are configured to bulge outward with respect to the substrate forming section 123 to allow for the placement of additional ultrahard material on the substrate material to compensate for differences in shrinkage expected during sintering.

Those skilled in the art will also appreciate that although the container assembly shown in FIG. 5 is a generally cylindrically in shape to form a generally cylindrical compact, in one or more other embodiments, the container assembly may have any configuration to form a compact of any shape or geometry. For example, in one or more embodiments, a container assembly may have a cross section that is generally triangular, rectangular, oval, or elliptic in shape to form a generally triangular, rectangular, oval, or elliptic shaped compact. Additionally, a container assembly may be configured to form a non-axisymmetric compact. A container assembly in accordance with an embodiment of the invention may be configured to have an internal geometry similar in form to any desired final geometry of the ultrahard compact with at least one section therein for forming ultrahard material expanded radially outward with respect to another section therein for forming substrate material of a compact.

Those skilled in the art will also appreciate that in one or more embodiments, a compact formed may include other materials, such as one or more layers of transition material or interface barrier material positioned between the ultrahard material and the substrate material of the compact. Transition material may be placed in the first section, the second section, or in a designated transition section between the first section and the second section. Depending on the thickness, shrinkage and consolidation properties of transition material, the container assembly may be configured to include a transition section specifically configured to pre-form transition material to compensate for any radial shrinkage differences between the transition material and the other materials so that a compact of substantially uniform shape results after sintering. For example, a container may be adapted to include a third section having an internal profile distinguishable from the profile of the first section and the second section. The third section may be placed between the first and second section, as desired, to provide a geometric transition between first section and the second section, such as a profile that tapers from the radial extend of the first section to the radial extent of the second section to provide a smoother geometric transition between materials formed in the pressing process.

Also, in one or more embodiments, the radial extent of a first section may be substantially constant along the length of the first section, as shown for example in FIG. 5. However, in other embodiments, the first section may have a radial extent that varies linearly or non-linearly along the length of the first section. One example of a linear variation along the length of the first section is shown in FIG. 10, wherein the first section 101 has a reverse-taper profile that increases in radial extent from the longitudinal axis 104 in a direction away from the second section 103 to compensate for increases radial shrinkage in ultrahard material with distance from substrate material. This configuration may be particularly useful for embodiments of the invention involving compacts with very thick ultrahard layers, such as layers greater than 2.0 mm in thickness.

Additionally, in other embodiments, ultrahard compacts may be made to include one or a plurality of masses of ultrahard material integrally formed with one or more masses of substrate material. For example, ultrahard compacts may be formed for cutting tools or earth boring bits to include one or more masses of ultrahard material sandwiched between or partially embedded in one or more masses of substrate material, such as disclosed in U.S. Pat. No. 5,722,499 to Nguyen et al, titled "Multiple Diamond Layer Polycrystalline Diamond Composite Cutters," and U.S. Pat. No. 6,272,753 to Packer, titled "Multi-layer, Multi-grade, Multiple Cutting Surface PDC Cutter," which are both assigned to the assignee of the present invention and incorporated herein by reference in their entireties. Additionally, ultrahard compacts may be formed to include one or more masses of substrate material sandwiched between or embedded in masses of ultrahard material.

In the manufacture of multi-layer or multi-surface ultrahard compacts, the containers used to pre-form and sinter the materials may be formed to extend grater radially in one more sections on one or more sides of the container where ultrahard material is to be placed in comparison with sections where substrate material is to be placed to allow for the placement of oversized ultrahard material on substrate material to compensate for the differences in shrinkage and consolidation for the different materials. Examples in accordance with this aspect of the invention and discussed above are shown in FIGS. 11 and 12, wherein the container side walls are configured to extend radially outward a greater extent about the entire periphery of the container in one or more sections for forming ultrahard material versus the one or more sections for forming substrate material.

Figure 13:
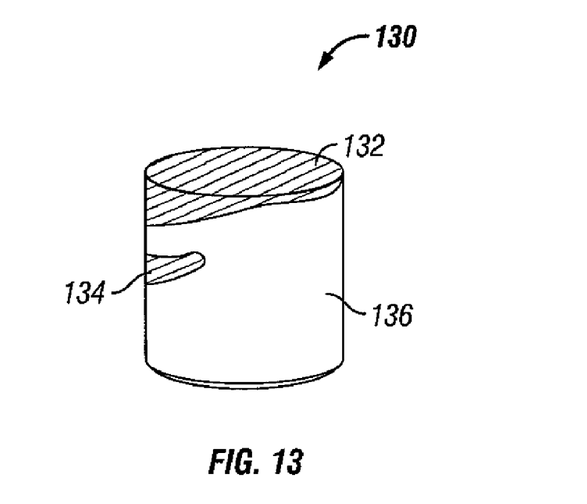
FIG. 13 shows one example of a compact including multiple ultrahard material masses formed with a substrate.
Figure 14:
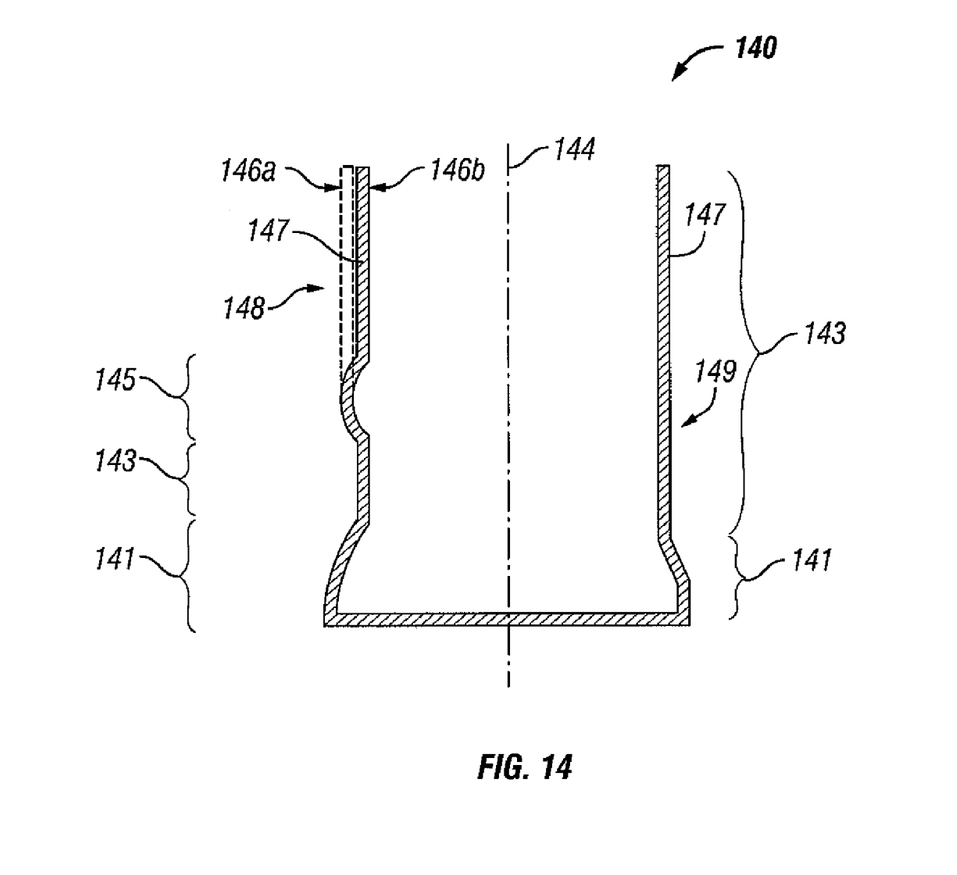
FIG. 14 shows one embodiment of a container that may be used to form a compact as shown in FIG. 13.

In another example, shown in FIG. 14, a container for forming a multi-layer ultrahard compact includes a side wall expanded to extent radially outward along only a portion of the periphery of the container to form ultrahard material in a section of the container that will be embedded in substrate material. For the example show, the container is shaped to form a compact as shown in FIG. 13.

The compact 130, shown in FIG. 13, includes a substrate 136 with a primary body of ultrahard material 132 bonded to a top surface of the substrate 136 and a secondary body of ultrahard material 134 forming a strip-like body embedded in the side surface of the substrate 136 a distance below the primary body of ultrahard material 132. The primary body of ultrahard material 132 has a variable thickness circumferentially such that the thickness of the ultrahard material is greatest along one side of the compact 130 designated as the leading or cutting edge. The secondary body of ultrahard material 134 is located on one side of the compact 130 below the cutting edge to provide an area of increased abrasion resistance for the compact 130. The secondary body of ultrahard material 134 spans a limited region of the compact's periphery where the increased abrasion resistance is desired most.

FIG. 14 shows a container in accordance with one embodiment of the invention that may be used to form the compact shown in FIG. 13. The container 140 includes side walls 147 adapted to form a plurality of ultrahard material masses (at 141, 145) and substrate material masses (at 143) therein. Wall segments shaped to form ultrahard material (141, 145) extend radially outward from the longitudinal axis 144 of the container 140 a greater extent than wall segments shaped to form substrate material (143) so that radially larger masses of ultrahard material can be placed in the container 140 with substrate material prior to a pressing process to compensate for differences in radial shrinkage between ultrahard material masses and substrate material during the pressing process.

The container 140 includes a first section 141, a second section 143, and a third section 145 therein. The first section 141 and third section 145 are configured to form ultrahard material, and the second section 143 is configured to form substrate material. The first section 141 and third section 145 extend radially outward a greater extent from the longitudinal axis 144 than the second section 143. The extent of the first section 141 and the second section 143 may be the same or different depending characteristics such as the thickness of the material to be formed in the section and the material compositions. The first section 141 is adapted to form a primary mass of ultrahard material (for 132 in FIG. 13) having a variable thickness about the periphery of the compact. The height of the wall segment (i.e., length of side 147 parallel to the longitudinal axis) forming the first section 141 adjacent the enclosed end of the container 140 varies about the periphery of the container 140. The height of the first section 141 on the first side 148 of the container 140 is greater than the height of the first section 141 on a second side 149 of the container 140. The second section 143 is disposed adjacent the first section 141, between the first section 141 and the third section 145 to form substrate material.

The third section 145, is adapted to form a secondary mass of ultrahard material (for 134 in FIG. 13), embedded in substrate material a selected distance away and generally aligned with the thicker portion of the first section 141. The third section 145 is positioned on the first side 148 of the container 140 and is formed to span less than the entire periphery of the container. The second side 149 of the container 140 radially opposite the third section 145 is adapted to form substrate material (indicated by 143). Thus, the third section 145 may be described as a bulged section in the container wall 147 that spans a limited peripheral region of the container 140.

To form the compact shown in FIG. 13, the container 140 in FIG. 14 is provided, but with the bulged portion of the third section 145 extending all the way to the open end of the container 140 (indicated by dashed lines 146*a*) to allow for the placement of a substrate having one side loaded with an oversized mass of ultrahard material therein. First, the first section 141 of the container 140 is loaded with ultrahard material particles. The ultrahard material may be pre-pressed in the first section 141 to remove voids. Then, a substrate having a groove formed in one side and filled with an oversized mass of ultrahard material extending laterally from its surface is aligned with the container 140 and loaded therein. Then, the loaded container is pre-pressed in an elastomer die to force the walls 147 of the container 140 to form around the compact material loaded therein. In particular, the pre-pressing operation forces the bulged segment 146*a* between the third section 145 and the open end of the container 140 to form against substrate material placed in the container, to position 146*b*, thereby trapping the oversized mass of ultrahard material in the third section 145 at the desired location. An end cap (not shown) is then placed on the container. The container may be further pre-pressed and then subjected to a HPHT pressing process that results in formation of an ultrahard compact as shown in FIG. 13. The container can be removed from the compact and the compact ground to a final desired geometry as described above.

In view of the descriptions above, those skilled in the art will appreciate that other embodiments of the invention may be configured to form any desired compact. One or more embodiments of the invention may be used to form a polycrystalline diamond compact primarily consisting of a polycrystalline diamond table bonded to a top surface of a tungsten carbide substrate. Additionally, ultrahard compacts formed in accordance with aspects of the invention discussed above may be used as cutting edges for cutting tools or cutting elements for drilling and mining tools.

Figure 15:
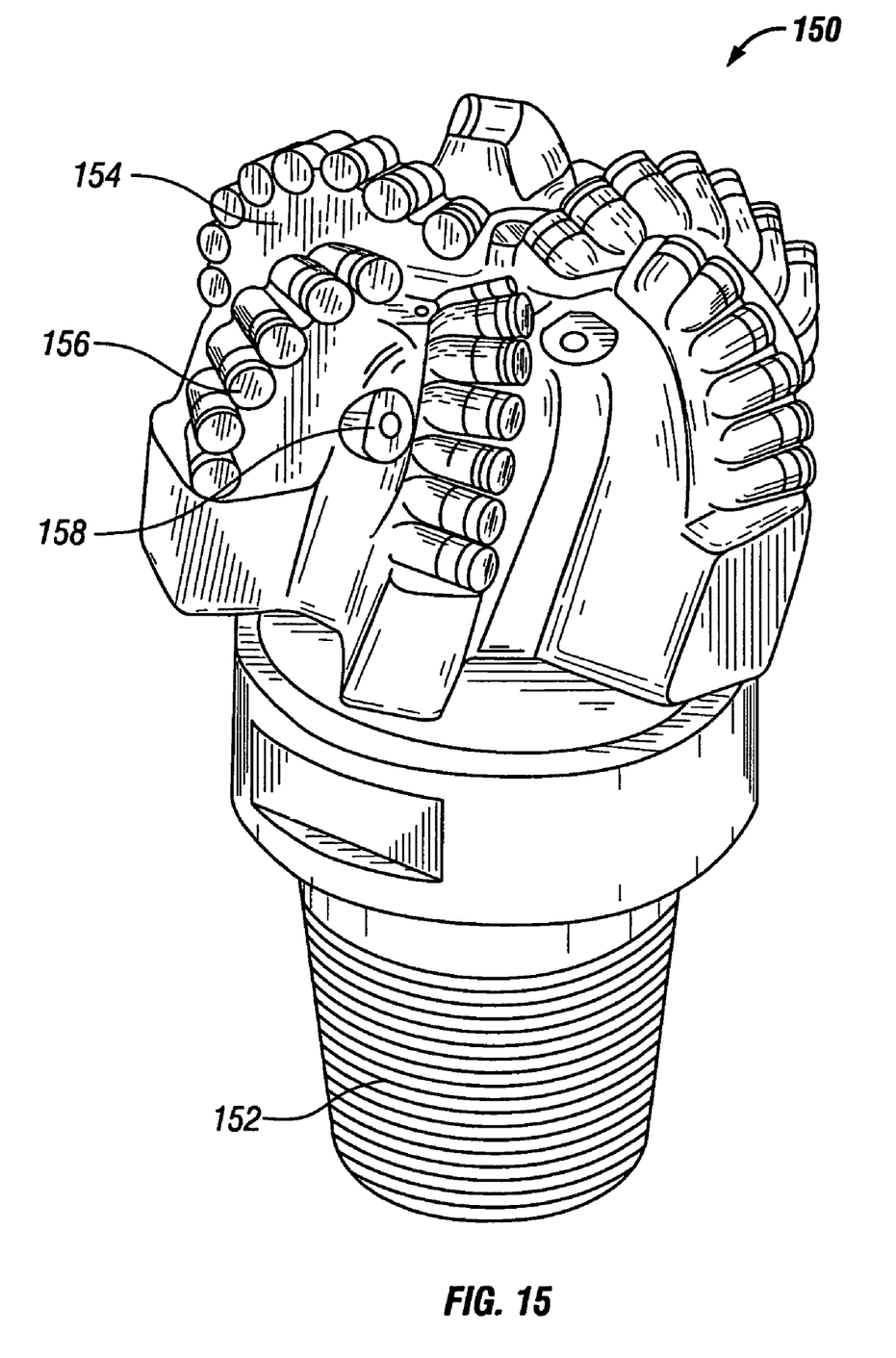
FIG. 15 shows one example of a drilling tool which includes one or more ultrahard compacts formed in accordance with an embodiment of the present invention.

One example of a drill bit that may include a compact manufactured in accordance with an embodiment of the invention is shown in FIG. 15. In this example, the drill bit 150 includes a bit body having one end 152 adapted to couple to a drill string and another end including a plurality of blades 154 arranged to extend there from to engage with formation during drilling. A plurality of cutters 156 are mounted on each of the blades 154 at selected locations and orientations to cut through formation when the bit 150 is applied to earth formations and rotated under an applied load during drilling. The cutters 156 comprise polycrystalline diamond compacts which include a mass of sintered ultrahard material (12 in FIG. 1) integrally formed with a metal carbide substrate (14 in FIG. 2). In this case, the ultrahard material is polycrystalline diamond, and the metal substrate is tungsten carbide formed with a cobalt binder. The cutters 156 are brazed or otherwise affixed in pockets formed in the blades 154.

Embodiments of the invention may provide one or more of the following advantages. One or more embodiments of the invention advantageously may provide for the production of near-net shape compacts from the press which require less grinding to achieve a desired geometry. One or more embodiments may be used to produce ultrahard compacts from a press that can be quickly centerless ground with less time required at the grinding wheel to achieve a final product of uniform shape. Producing compacts from a pressing process that have closer to desired geometries, advantageously, may reduce the output time for manufacturing ultrahard compacts, and result in significant cost savings over conventional manufacturing techniques. Additionally, one or more embodiments of the invention, advantageously, may also result in a significant cost savings in grinding wheel costs because less grinding is required to produce a final product. Also, forming near net-shaped compacts during the HPHT process in accordance with one or more embodiments of the invention may, advantageously, result in lower residual stresses in the compact material, especially at the interface, in comparison to conventional formed compacts. As a result, methods in accordance with one or more embodiments of the invention may provide longer lasting compacts, cutting tools, and bits.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for forming an ultrahard compact comprising:
    assembling a mass of ultrahard material with a mass of substrate material to form a pre-sintered compact such that the mass of ultrahard material extends further from a central axis of the compact than the mass of substrate material, and the mass of substrate material forms at least part of a side surface of the pre-sintered compact; and
    subjecting the pre-sintered compact to a high pressure high temperature process to form an ultrahard compact comprising an ultrahard layer integrally formed with a substrate wherein the subjecting results in the ultrahard layer being formed substantially uniform with the substrate.

2. The method of claim 1, wherein the assembling comprises forming the mass of ultrahard material to extend further than the mass of substrate material by an amount of between about 2% and about 20% of the extent of the mass of substrate material from the central axis.

3. The method of claim 2, wherein the assembling comprises forming the mass of ultrahard material to have a thickness of at least about 1.0 mm.

4. The method of claim 2, wherein the mass of substrate material is generally cylindrical in shape with a diameter of between 8 mm and 75 mm.

5. The method of claim 2, wherein the assembling further includes forming the mass of ultrahard material to have a thickness that varies about the periphery of the pre-sintered compact.

6. The method of claim 2, wherein the assembling further comprises forming the mass of ultrahard material to extend further from the central axis about an entire periphery of the pre-sintered compact.

7. The method of claim 2, wherein the assembling comprises filling a groove formed in the mass of substrate material with the mass of ultrahard material and forming the mass of ultrahard material to extend from a surface of the mass of substrate material.

8. The method of claim 2, wherein the assembling further comprises assembling a second mass of ultrahard material with the mass of substrate material.

9. The method of claim 2, wherein the assembling further comprises assembling a second mass of substrate material with the mass of ultrahard material.

10. The method of claim 2, wherein the ultrahard material comprises one selected from the group of diamond and cubic boron nitride.

11. The method of claim 2, wherein the substrate material comprises tungsten carbide.

12. The method of claim 2, wherein forming the pre-sintered compact further comprises:
placing at least one mass of additional material between the mass of ultrahard material and the mass of substrate material.

13. A method for forming a compact, comprising:
assembling a mass of ultrahard material with a mass of substrate material to form a pre-sintered compact such that the mass of ultrahard material extends further from a central axis of the compact than the mass of substrate material, and the mass of substrate material forms at least part of a side surface of the pre-sintered compact; wherein the assembling comprises:
placing the mass of ultrahard material in a first section of a container;
placing the mass of substrate material in a second section of the container;
placing the first section of the container in a forming die; and
exerting a force on the mass of ultrahard material in the container to forces a side wall of the container to expand outward in the first section and extend further outward in the first section than in the second section.

14. A method for forming a compact, comprising:
assembling a mass of ultrahard material with a mass of substrate material to form a pre-sintered compact such that the mass of ultrahard material extends further from a central axis of the compact than the mass of substrate material, and the mass of substrate material forms at least part of a side surface of the pre-sintered compact; wherein the assembling comprises:
placing the mass of ultrahard material in a first section of a container having a side wall that extends outward an amount further in the first section than in a second section; and
placing the mass of substrate material in the second section of the container.

15. The method of claim 14, wherein prior to the assembling, further comprising:
forming the side wall of the container in the first section to extend outward the amount further in the first section than in the second section by placing an expandable material in the first section;
placing the first section of the container in a forming die; and
exerting a force on the expandable material such that the side wall of the container expands outward in the first section.

16. The method of claim 14, wherein the container is generally cylindrical and has an internal diameter that varies along its length and an opening at one end to permit placement of material therein.

17. The method of claim 14, wherein the side wall in the first section increases in outward extent in a direction away from the second section.

18. The method of claim 14, wherein the amount further is between about 2% and about 20% of the distance from a container central axis to the side wall in the second section.

19. The method of claim 18, wherein the assembling further comprises:
placing a second mass of ultrahard material in a third section of the container, the third section located a distance from the first section.

20. The method of claim 19, wherein the third section of the container is formed by a side wall that extends outward a greater distance in the third section than in the second section to form the second mass of ultrahard material to extend a greater distance from the central axis than the mass of substrate material in the second section.

21. The method of claim 18, wherein the forming the pre-sintered compact further comprises:
placing a second mass of substrate material in a third section of the container.

22. The method of claim 18, wherein the container is formed of at least one selected from the group of niobium, tantalum, tungsten, molybdenum, zirconium, hafnium, and titanium.

23. A method for forming an compact, comprising filling a first section of a generally cylindrical container with ultrahard material;
filling a second section of the container with substrate material, wherein a diameter of the container in the first section is between about 2% and about 20% larger than the diameter of the container in the second section so that the mass of ultrahard material formed is larger than the mass of substrate material to compensate for a difference in a radial shrinkage during a high pressure, high temperature pressing process; and
subjecting the container to the high pressure, high temperature pressing process to form an ultrahard compact of substantially uniform shape including an ultrahard layer integrally formed with a support substrate.

* * * * *